(12) United States Patent
Tretter

(10) Patent No.: US 8,107,181 B2
(45) Date of Patent: Jan. 31, 2012

(54) APPARATUS, SYSTEM, AND METHOD FOR MEASURING MAGNETORESISTIVE HEAD RESISTANCE

(75) Inventor: Larry LeeRoy Tretter, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 1037 days.

(21) Appl. No.: 11/554,580

(22) Filed: Oct. 30, 2006

(65) Prior Publication Data

US 2008/0100948 A1    May 1, 2008

(51) Int. Cl.
G11B 5/03    (2006.01)
G11B 5/02    (2006.01)
(52) U.S. Cl. ............................. 360/66; 360/67
(58) Field of Classification Search .......... None
See application file for complete search history.

(56) References Cited

U.S. PATENT DOCUMENTS

| | | |
|---|---|---|
| 5,589,777 A | 12/1996 | Davis et al. |
| 5,790,334 A | 8/1998 | Cunningham |
| 5,790,335 A | 8/1998 | Sugawara et al. |
| 5,986,839 A | 11/1999 | Klaassen et al. |
| 6,067,200 A | 5/2000 | Ohba et al. |
| 6,215,302 B1 | 4/2001 | Carey |
| 6,225,802 B1 | 5/2001 | Ramalho et al. |
| 6,320,713 B1 * | 11/2001 | Tretter et al. .............. 360/66 |
| 6,512,367 B2 | 1/2003 | Liu et al. |
| 6,631,048 B1 | 10/2003 | Tanaka |
| 6,731,448 B2 | 5/2004 | Briskin et al. |
| 6,744,578 B1 | 6/2004 | Bishop |
| 6,898,040 B2 | 5/2005 | Jang et al. |
| 7,035,030 B2 | 4/2006 | Takayoshi et al. |
| 2004/0035941 A1 | 2/2004 | Ranmuthu et al. |
| 2004/0085670 A1 | 5/2004 | Li et al. |

* cited by examiner

Primary Examiner — Daniell L Negron
(74) Attorney, Agent, or Firm — Kunzler Needham Massey & Thorpe

(57) ABSTRACT

An apparatus, system, and method are disclosed for measuring magnetoresistive head assembly resistance. A measurement module measures a reference voltage across a reference resistance while applying a reference current to the reference resistance. In addition, the measurement module measures a test voltage across a first biasing resistor, a MR head assembly, and a second biasing resistor connected in series while applying the reference current to the first biasing resistor, the MR head assembly, and the second biasing resistor. A computation module calculates the MR head assembly resistance from the reference voltage, the test voltage, the reference resistance, and the resistances of the first and second biasing resistors.

16 Claims, 7 Drawing Sheets

APPARATUS, SYSTEM, AND METHOD FOR MEASURING MAGNETORESISTIVE HEAD RESISTANCE

BACKGROUND OF THE INVENTION

1. Field of the Invention

This invention relates to measuring magnetoresistive ("MR") head resistance and more particularly relates to measuring the MR head resistance using a constant reference current.

2. Description of Related Art

A magnetic data storage device such as a magnetic tape drive, hard disk drive, and the like often employs a MR head to record data to or read data from a magnetic media such a magnetic tape, a hard disk, and the like. The magnetic data storage device typically employs at least one MR head to read data and at least one head to write data.

A write head writes data to the magnetic media by creating a magnetic field in response to an electronic signal. The magnetic field varies in response to changes in the strength and polarity of the electronic signal. In addition, the varying magnetic field modifies the magnetic polarization of the magnetic media in a region of the magnetic media adjacent to the write head. Thus by encoding data as changes of strength and polarity in the electronic signal, the write head encodes the data as magnetic polarities on the magnetic media as the write head moves relative to the magnetic media.

A read MR head reads data from the magnetic media by creating an electronic signal as induced by the change of magnetic polarities between the various regions of the magnetic media as the read MR head moves relative to magnetic media. Because the data was written to the magnetic media as changes in magnetic polarity, the electronic signal from the read MR head may be decoded to retrieve the data from the magnetic media.

The performance of the MR head is highly sensitive to the electrical characteristics of the MR head. In particularly, a manufacturer must know the electrical resistance of the MR head. In the past, the resistance of the MR head has been measured by applying known reference current to the MR head, measuring a voltage across the MR head, and calculating the resistance from the reference current and the voltage. Unfortunately, the reference current used to measure the resistance is often not known with sufficient precision or accuracy, reducing the precision and accuracy of the calculated resistance.

From the foregoing discussion, it should be apparent that a need exists for an apparatus, system, and method that measure MR head resistance independent of any measurement of the reference current. Beneficially, such an apparatus, system, and method would more precisely and accurately measure the resistance of the MR head.

SUMMARY OF THE INVENTION

The present invention has been developed in response to the present state of the art, and in particular, in response to the problems and needs in the art that have not yet been fully solved by currently available MR head measurement methods. Accordingly, the present invention has been developed to provide an apparatus, system, and method for measuring MR head resistance that overcome many or all of the above-discussed shortcomings in the art.

The apparatus to measure MR head resistance is provided with a logic unit containing a plurality of modules configured to functionally execute the necessary steps of measuring a reference voltage across a reference resistance, measuring a test voltage, and calculating a MR head resistance. These modules in the described embodiments include a measurement module and a computation module.

The measurement module measures a reference voltage across a reference resistance while applying a reference current to the reference resistance. In one embodiment, the measurement module comprises a constant current source that generates the reference current. The measurement module also applies the reference current to a first biasing resistor, a MR head assembly, and a second biasing resistor connected in series and measures a test voltage across the first biasing resistor, the MR head assembly, and the second biasing resistor. The MR head assembly includes the MR head and connectors, physical supports, and the like required to connect and mount the MR head in a magnetic data storage device.

The computation module calculates the MR head assembly resistance from the reference voltage, the test voltage, the reference resistance, and the resistance of the first and second biasing resistors. In one embodiment, the computation module calculates the MR head assembly resistance using a ratio of the reference current divided by the reference current such that the reference current is not a factor in the calculation. The apparatus calculates the resistance of the MR head assembly without relying on the accuracy or precision of a measurement of the reference current.

A system of the present invention is also presented to measure MR head resistance. The system may be embodied in a MR head assembly test system. In particular, the system, in one embodiment, includes a host system, a communication channel, and a test device.

The host system manages testing of a MR head assembly. The test device is in communication with the host system through the communication channel. In addition, the test device tests the MR head assembly under the direction of the host system. The test device includes a measurement module. The measurement module measures a reference voltage across a reference resistance while applying a reference current to the reference resistance. The measurement module also applies the reference current to a first biasing resistor, the MR head assembly, and a second biasing resistor connected in series and measures a test voltage across the first biasing resistor, the MR head assembly, and the second biasing resistor.

The host module includes a computation module. The computation module calculates the MR head assembly resistance from the reference voltage, the test voltage, the reference resistance, and the resistances of the first and second biasing resistors communicated to the host module from the test device.

The test device may further include an automation module. The automation module automates the connection of the MR head assembly to the first and second biasing resistors. The system measures the MR head resistance independent of any measurement of the reference current.

A method of the present invention is also presented for measuring MR head resistance. The method in the disclosed embodiments substantially includes the steps necessary to carry out the functions presented above with respect to the operation of the described apparatus and system. In one embodiment, the method includes measuring a reference voltage across a reference resistance, measuring a test voltage, and calculating a MR head resistance.

A measurement module measures a reference voltage across a reference resistance while applying a reference current to the reference resistance. In addition, the measurement module measures a test voltage across a first biasing resistor, a MR head assembly, and a second biasing resistor connected in series while applying the reference current to the first biasing resistor, the MR head assembly, and the second biasing resistor. A computation module calculates the MR head assembly resistance from the reference voltage, the test voltage, the reference resistance, and the resistances of the first and second biasing resistors. The method measures the voltage across both the reference resistance and the biased MR head assembly using the same reference current such that the resistance of the MR head assembly may be calculated without using a reference current value.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

The present invention measures the resistance of a MR head assembly by measuring a reference voltage across a reference resistance and a test voltage across the biased MR head assembly while applying a constant reference current. In addition, the present invention further calculates the MR head assembly resistance. The present invention may use a ratio of the reference current divided by the reference current to calculate the MR head assembly resistance such that the reference current is not a factor in the calculation. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
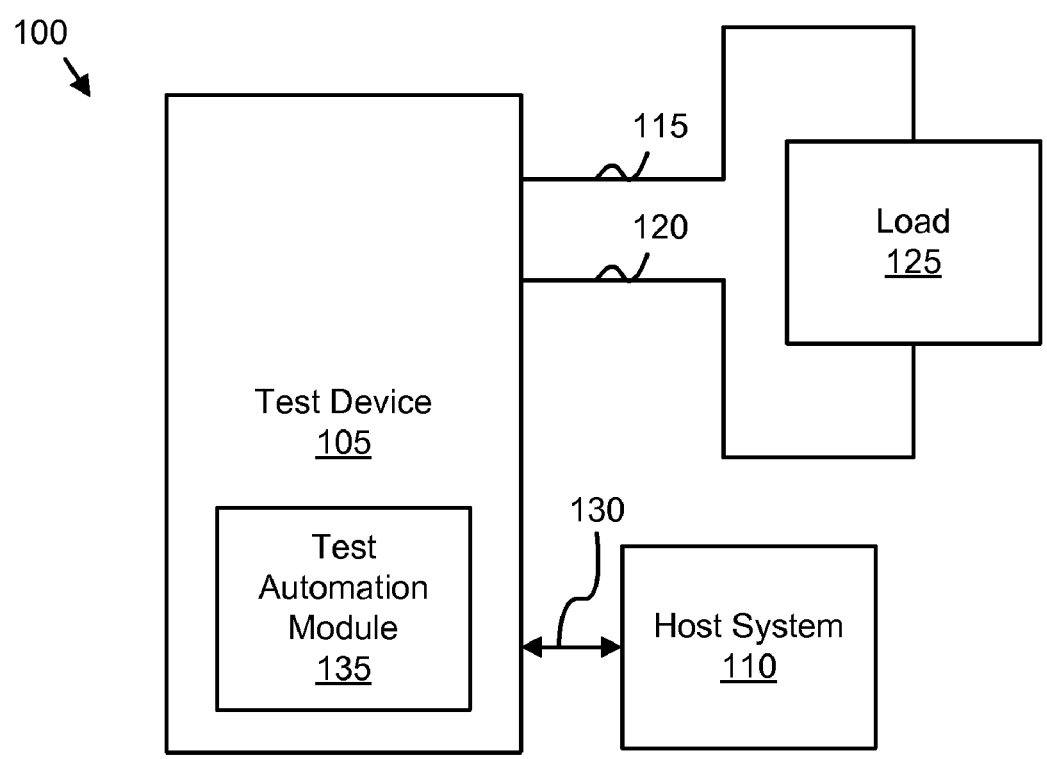
FIG. 1 is a schematic block diagram illustrating one embodiment of a MR head assembly test system of the present invention.

Many of the functional units described in this specification have been labeled as modules, in order to more particularly emphasize their implementation independence. For example, a module may be implemented as a hardware circuit comprising custom very large scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

FIG. 1 is a schematic block diagram illustrating one embodiment of a MR head assembly test system 100 of the present invention. The system 100 includes a test device 105, a communications channel 130, and a host system 110. In one embodiment, the test device 105 further comprises a test automation module 135.

The host system 110 manages testing of a MR head assembly. The host system 110 may be a computer, a server, a dedicated test controller, or the like. The MR head assembly includes a MR head and one or more connectors, one or more physical supports, and the like required to connect and mount the MR head in a magnetic data storage device. The test device 105 is in communication with the host system 110 through the communication channel 130. The communication channel may be a serial bus, a universal serial bus, or the like. The test device 105 tests the MR head assembly under the direction of the host system 110. The host system 110 may also compile test results, provide an interface for operator control of the test, and communicate test results to a manufacturing system. In addition, the host system 110 may perform calculations using data measured by the test device 105.

The test device 105 includes a test connection 115 and a connection 120. In the depicted embodiment, the connection 120 is ground. A load 125 is connected to the test connection 115 and the connection 120. In addition, the test device 105 applies a reference current to the load 125 and measures the voltage between the test connection 115 and the connection 120. The load 125 may be a biased MR head assembly. In a certain embodiment, the load 125 is a reference resistance. The voltage measurement is communicated to host system 110.

The test automation module 135 may automate the connection of the MR head assembly to the test device 105. For example, the automation module 135 may comprise a robotic arm that picks the MR head assembly from a tray, electrically connects the MR head assembly to the test connection 115 and connection 120 for test voltage measurement, and returns the MR head assembly to the tray. In one embodiment, the host system 110 controls the test automation module 135.

Figure 2:
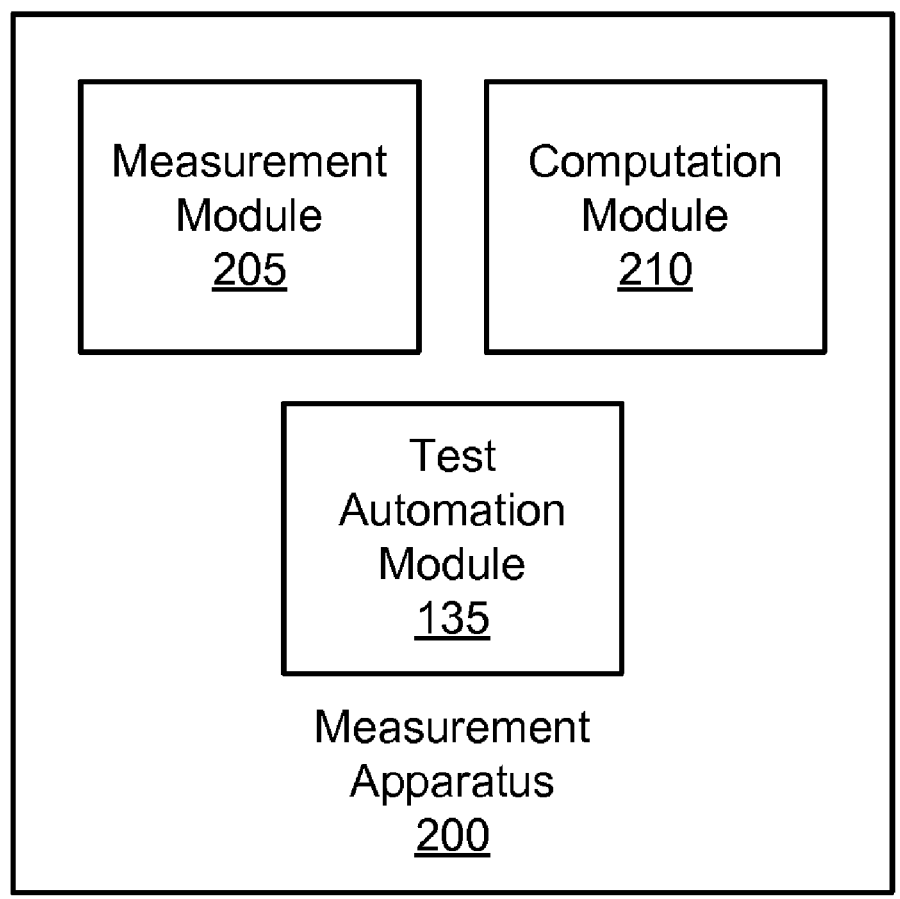
FIG. 2 is a schematic block diagram illustrating one embodiment of a measurement apparatus of the present invention.

FIG. 2 is a schematic block diagram illustrating one embodiment of a measurement apparatus 200 of the present invention. The system 100 of FIG. 1 may comprise the apparatus 200. As depicted, the apparatus 200 includes a measurement module 205, and a computation module 210. In one embodiment, the test device 105 of FIG. 1 comprises the measurement module 205. The host system 110 of FIG. 1 may comprise the computation module 210. In an alternate embodiment, the test device 105 of FIG. 1 also comprises the computation module 210. In a certain embodiment, the apparatus 200 further includes a test automation module 135 such as the test automation module 135 of FIG. 1.

The measurement module 205 measures a reference voltage across a reference resistance while applying a reference current to the reference resistance. In one embodiment, the measurement module 205 comprises a constant current source that generates the reference current. The measurement module 205 also applies the reference current to a first biasing resistor, a MR head assembly, and a second biasing resistor connected in series and measures a test voltage across the first biasing resistor, the MR head assembly, and the second biasing resistor. For example, the measurement module 205 may measure a reference voltage of one point three volts (1.3 V) across a one thousand five hundred Ohm (1500Ω) reference resistance. The measurement module 205 may further measure a test voltage of one point two five volts (1.25 V) across the first biasing resistor, the MR head assembly, and the second biasing resistor connected in series.

In one embodiment, the measurement module 205 stores both the reference voltage measurement and the test voltage measurement. The measurement module 205 may further communicate the reference voltage measurement and the test voltage measure to the host system 110.

The computation module 210 calculates the MR head assembly resistance from the reference voltage, the test voltage, the reference resistance, and the resistance of the first and second biasing resistors. Equation 1 shows the relationship between the reference voltage $V_{ical}$, the reference current $I_{ref}$, and the reference resistance $R_{ref}$ while Equation 2 shows the relationship between the test voltage $V_{hb}$, the reference current $I_{ref}$, the MR head resistance $R_h$, the first bias resistor $R_{b1}$ resistance, and the second bias resistor $R_{b2}$ resistance.

$$V_{ical} = I_{ref} R_{ref} \qquad \text{Equation 1}$$

$$V_{hb} = I_{ref}(R_{b1} + R_{b2} + R_h) \qquad \text{Equation 2}$$

In one embodiment, the computation module 210 calculates the MR head assembly resistance $R_h$ using a ratio of the reference current $I_{ref}$ divided by the reference current $I_{ref}$ such that the reference current $I_{ref}$ is not a factor in the calculation. For example, Equation 3 illustrates dividing Equation 1 by Equation 2, resulting with the ratio of the reference current $I_{ref}$ divided by the reference current $I_{ref}$ included in Equation 3.

$$\frac{V_{ical}}{V_{hb}} = \frac{I_{ref}}{I_{ref}} \frac{R_{ref}}{(R_{b1} + R_{b2} + R_h)} \qquad \text{Equation 3}$$

Thus the apparatus 200 may calculate the resistance of the MR head assembly without relying on the accuracy or precision of a measurement of the reference current.

Figure 3:
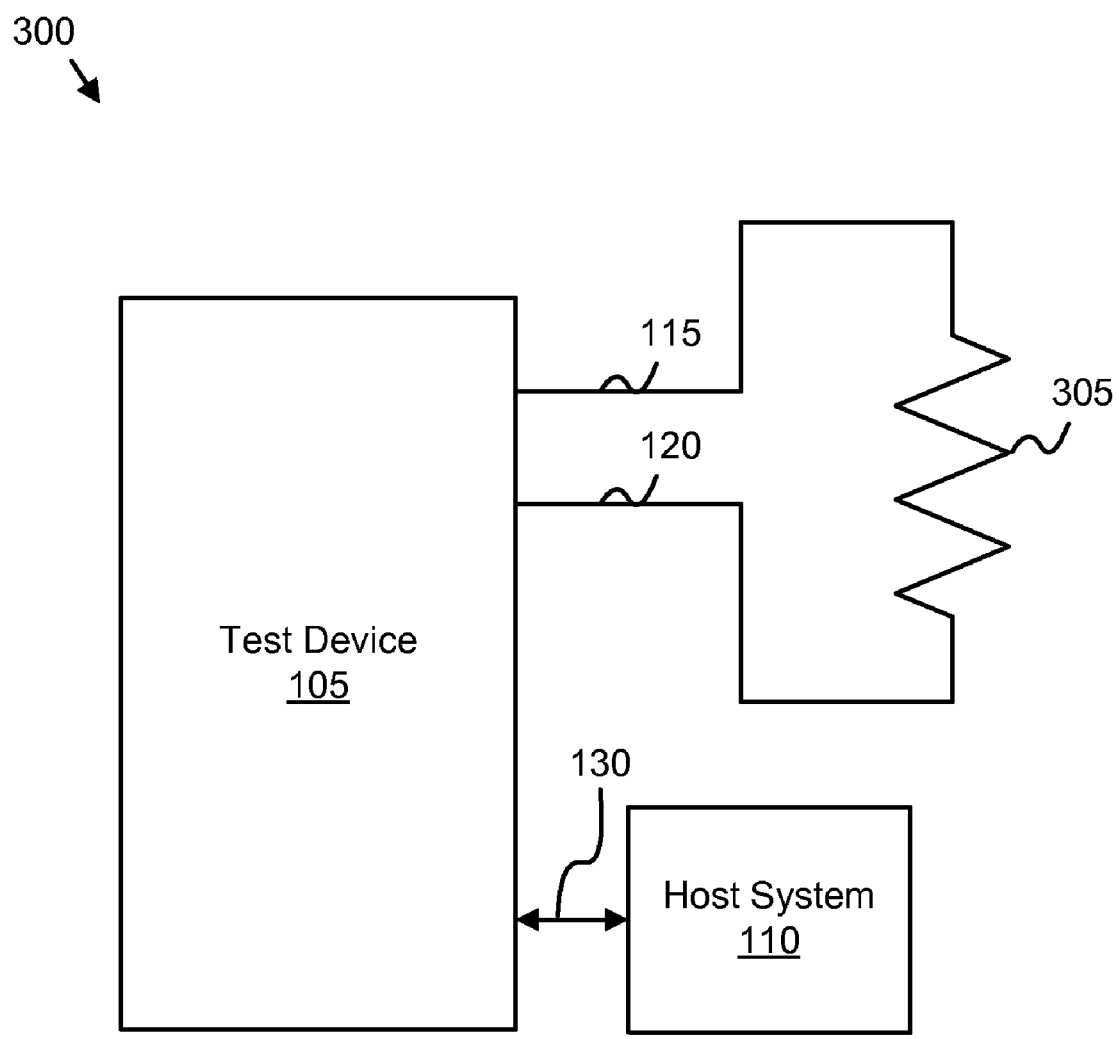
FIG. 3 is a schematic block diagram illustrating one embodiment of a test device with reference resistance in accordance with the present invention.

FIG. 3 is a schematic block diagram illustrating one embodiment of a test device 105 with reference resistance 300 in accordance with the present invention. The test device 105 of FIG. 1 is depicted with a reference resistor 305 connected to a test connection 115 and a connection 120. In one embodiment, the reference resistor 305 is the reference resistance of Equations 1 and 3. The test device 105 applies a reference current to the reference resistor 305 and measures a reference voltage. The reference voltage may be communicated to the host system 110 of FIG. 1 by the test device 105 over the communication channel 130.

In one embodiment, the resistance of the reference resistor 305 is measured independently of the test device 105 and communicated to the host system 110. For example, an operator may measure the resistance of the reference resistor 305 as one thousand five hundred Ohms (1500Ω) and input the resistance value of one thousand five hundred Ohms (1500Ω) to the host system 110 as the reference resistor 305 resistance.

Figure 4:
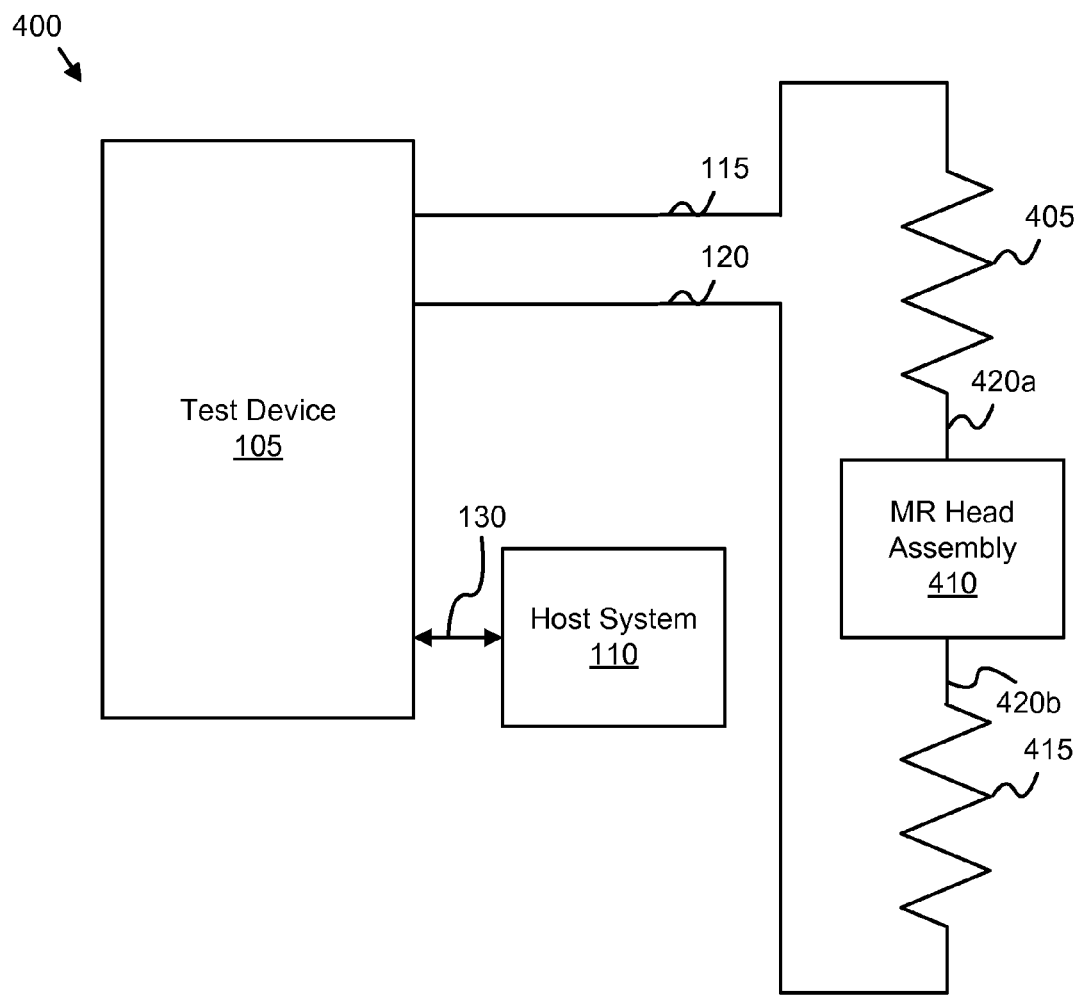
FIG. 4 is a schematic block diagram illustrating one embodiment of a test device with biased MR head assembly in accordance with the present invention.

FIG. 4 is a schematic block diagram illustrating one embodiment of a test device 105 with biased MR head assembly 400 in accordance with the present invention. The test device 105 of FIG. 1 is depicted with a first biasing resistor 405, a MR head assembly 410, and the second biasing resistor 415 connected in series to the test connection 115 and the connection 120. The first and second bias resistors 405, 415 may be selected to bias the voltage of the MR head assembly connections 420 to a specified direct current ("DC") voltage.

The test device 105 applies the same reference current applied to the reference resistor 305 of FIG. 3 to the first biasing resistor 405, the MR head assembly 410, and the second biasing resistor 415 and measures a test voltage. The test voltage may be communicated to the host system 110 of FIG. 1 by the test device 105. In one embodiment, the resistances of the first and second bias resistors 405, 415 is measured independently of the test device 105 and communicated to the host system 110. For example, an operator may measure and input a resistance value of five hundred and four Ohms (504Ω) to the host system 110 as the first bias resistor 405 resistance and four hundred and ninety-eight Ohms (498Ω) to the host system 110 as the second bias resistor 415 resistance.

Figure 5:
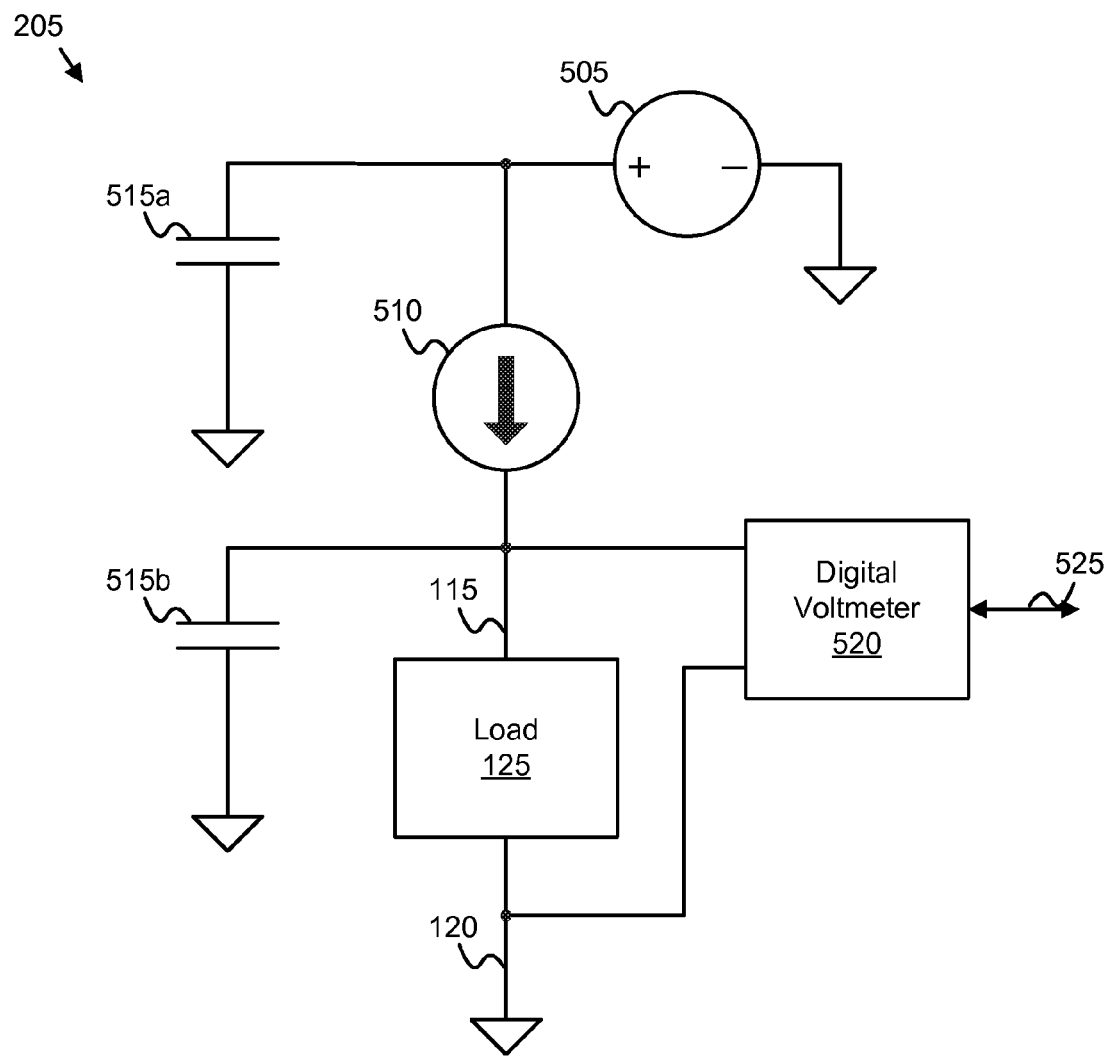
FIG. 5 is a schematic block diagram illustrating one embodiment of a measurement module of the present invention.

FIG. 5 is a schematic block diagram illustrating one embodiment of a measurement module 205 of the present invention. The measurement module 205 is one embodiment of the measurement module 205 of FIG. 2 and may be comprised by the test device 105 of FIGS. 1, 3, and 4.

The measurement module 205 includes a constant voltage source 505, a constant current source 510, one or more capacitors 515, a digital voltmeter 520, and a test communication channel 525. In addition, the measurement module 205 is depicted with the test connection 115 and the connection 120 of FIGS. 1, 3, and 4. In one embodiment, a power source such as a power supply comprises the constant voltage source 505 and the constant current source 510. The constant current source 510, digital voltmeter 520, and second capacitor 515b are all connected to the test connection 115.

The capacitors 515 function as a high frequency filter. Although depicted as single capacitor 515, each capacitor 515 may be configured as one or more electrical components arranged as a high frequency filter as is well known to those skilled in the art. The capacitors 515 filter electrical noise that is above a specified frequency.

The constant current source 510 supplies a reference current to a load 125 through the test connection 115. In one embodiment, the constant current source 510 supplies a reference current equivalent to the operating current of the MR head assembly 410 when the MR head assembly is installed in a magnetic data storage device. In an alternate embodiment, the constant current source 510 supplies a reference current that is less than the normal operating current of the MR head assembly 410. For example, the reference current may be half the operating current to reduce heating the MR head assembly 410. The load 125 may be the reference resistor 305 of FIG. 3. or the first biasing resistor 405, MR head assembly 410, and second biasing resistor 415 of FIG. 4. The connection 120 completes the circuit. In one embodiment, the test connector 115 and the connection 120 comprise connectors such as are used to connect and mount the MR head assembly 410 to a magnetic data storage device.

The digital voltmeter 520 measures the voltage across the load 125 between the test connector 115 and the connection 120. For example, the digital voltmeter 520 may measure the reference voltage across the reference resistor 305 of FIG. 3 and the test voltage across the first biasing resistor 405, MR head assembly 410, and second biasing resistor 415 of FIG. 4. The digital voltmeter 520 communicates the voltage over the test communication channel 525. In one embodiment, the test communication channel 525 communicates with the test device 105 of FIG. 1. In an alternate embodiment, the test communication channel 525 is the communication channel of FIGS. 1, 3, and 4.

For example, the digital voltmeter 520 may communicate a test voltage of one point two five volts (1.25 V) to the host system 110 of FIG. 1. The digital voltmeter 520 may also communicate a reference voltage of one point three volts (1.3 V) to the host system 110. The measurement module 205 measures the reference voltage and test voltage used to calculate the MR head assembly resistance.

Figure 6:
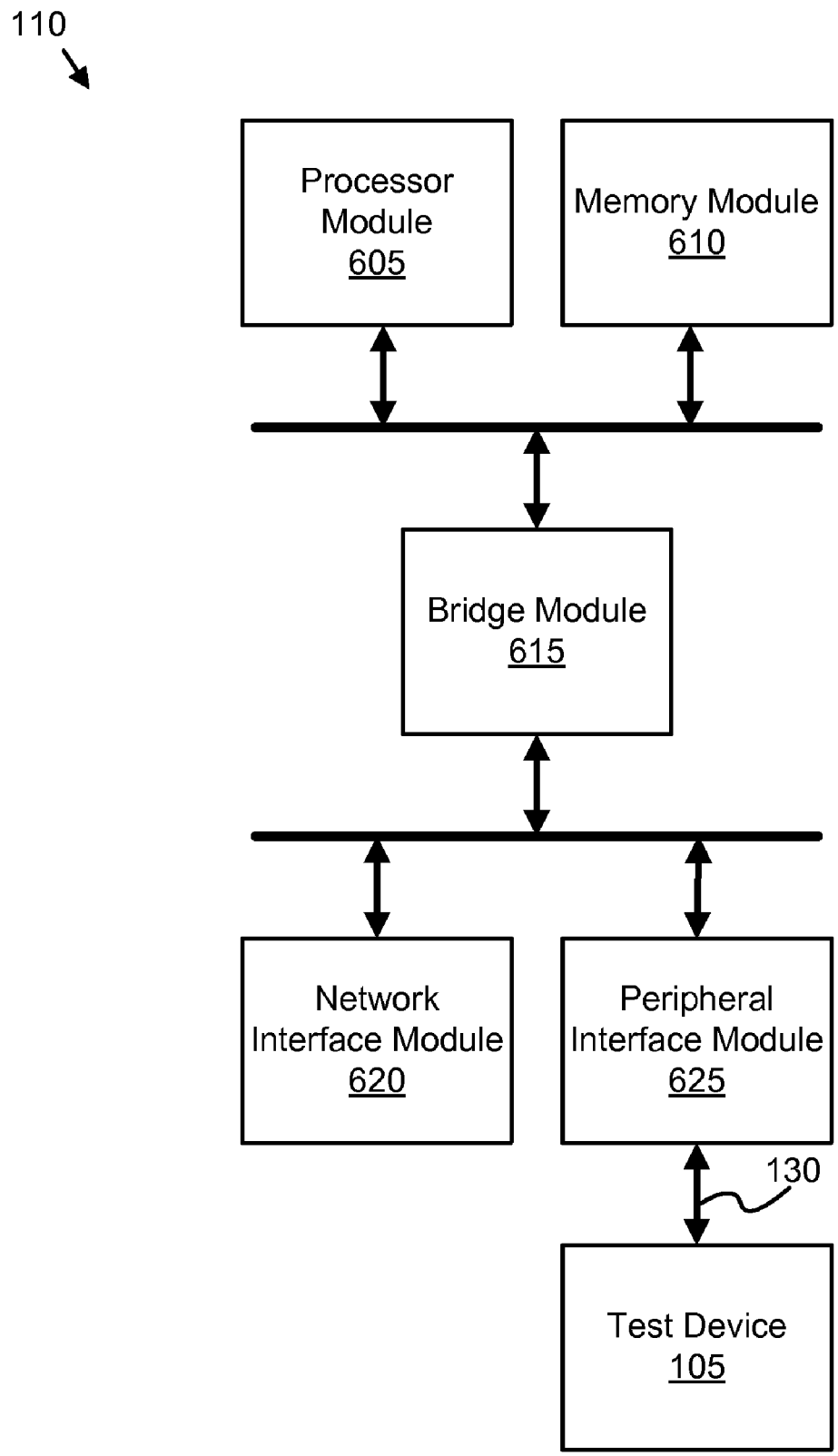
FIG. 6 is a schematic block diagram illustrating one embodiment of host system of the present invention.

FIG. 6 is a schematic block diagram illustrating one embodiment of host system 110 of the present invention such as the host system 110 of FIG. 1. The system 110 includes a processor module 605, a memory module 610, a bridge module 615, a network interface module 620, and a peripheral interface module 625. In addition, the system 110 is depicted in communication with a test device 105 such as the test device 105 of FIG. 1.

The processor module 605, memory module 610, bridge module 615, network interface module 620, and peripheral interface module 625 may be fabricated of semiconductor gates on one or more semiconductor substrates. Each semiconductor substrate may be packaged in one or more semiconductor devices mounted on circuit cards. Connections between the processor module 605, the memory module 610, the bridge module 615, the network interface module 620, and the peripheral interface module 625 may be through semiconductor metal layers, substrate to substrate wiring, or circuit card traces or wires connecting the semiconductor devices.

The memory module 610 stores software instructions and data. The processor module 605 executes the software instructions and manipulates the data as is well know to those skilled in the art. The processor module 605 communicates with the network interface module 620 and the peripheral interface module 625 through the bridge module 615. For example, the test device 105 may communicate the reference voltage and test voltage to the host system 110 over the communication channel 130 and through the peripheral interface module 625.

In one embodiment, the processor module 605 executes software instructions comprising one or more processes that control the test device 105. The processor module 605 may also execute one or more processes comprising the computation module 210 of FIG. 2. The host system 110 may calculate the MR head assembly 410 resistance from the reference voltage, the test voltage, the reference resistor 305 resistance, and the resistances of the first and second biasing resistors 405, 415.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 7:
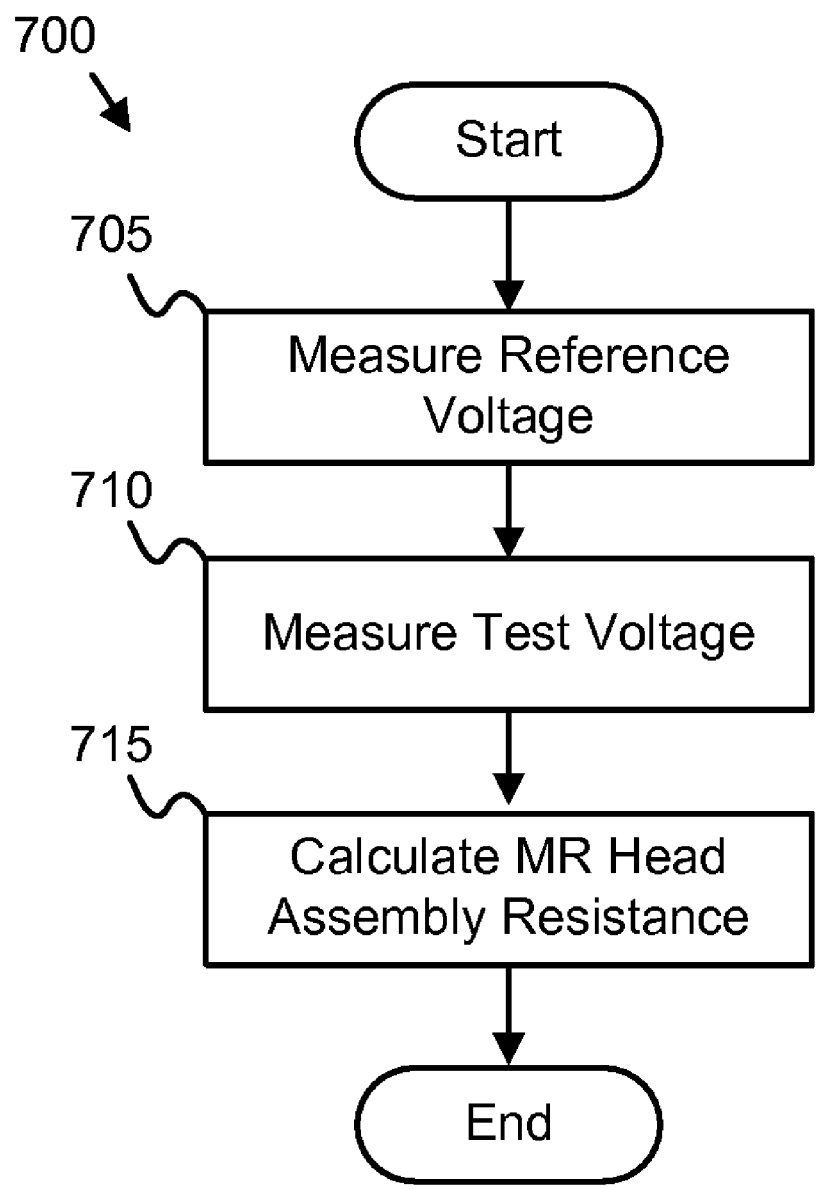
FIG. 7 is a schematic flow chart diagram illustrating one embodiment of a measurement method in accordance with the present invention.

FIG. 7 is a schematic flow chart diagram illustrating one embodiment of a measurement method 700 of the present invention. A measurement module 205 measures 705 a reference voltage across a reference resistance such as the reference resistor 305 of FIG. 3 while applying a reference current to the reference resistance. In one embodiment, the reference resistance is known. For example, the reference resistance may be a calibrated resistance.

In addition, the measurement module 205 measures 710 a test voltage across a first biasing resistor 405, a MR head assembly 410, and a second biasing resistor 415 connected in series while applying the reference current to the first biasing resistor 405, the MR head assembly 410, and the second biasing resistor 415. The first biasing resistor 405, the MR head assembly 410, and the second biasing resistor 415 may be the first biasing resistor 405, the MR head assembly 410, and the second biasing resistor 415 of FIG. 4.

In one embodiment, the reference current is in the range of twenty percent less than an operating current of the MR head assembly to twenty percent greater than the operating current of the MR head assembly. The operating current may be the average current applying to the MR head assembly during the normal operation of a magnetic data storage device. In an alternate embodiment, the reference current is in the range of twenty percent less than half the operating current of the MR head assembly to twenty percent greater than half the operating current of the MR head assembly.

In one embodiment, the resistances of the first and second bias resistors 405, 415 are known. In an alternate embodiment, the method 700 is used to calculate the resistance of the first and second bias resistors 405, 415 from a test voltage measurement made with the first and second bias resistors 405, 415 connected in series, but without the MR head assembly 410.

A computation module 210 calculates 715 the MR head assembly resistance from the reference voltage, the test voltage, the reference resistance, and the resistance of the first and second biasing resistors 405, 415. In one embodiment, Equation 3 is solved for the MR head assembly 410 resistance $R_h$ as shown in Equation 4.

$$R_h = ((R_{ref} V_{hb})/V_{ical}) - (R_{b1} + R_{b2})$$ Equation 4

The computation module 210 may employ Equation 4 to calculate the MR head assembly 410 resistance. In one embodiment, Equation 4 is rendered as a process comprising software instructions. The process may execute on the host system 110 of FIGS. 1 and 6 to calculate the MR head assembly 410 resistance. The method 700 measures the voltage across both the reference resistance and the biased MR head assembly 410 using the same reference current such that the resistance of the MR head assembly 410 may be calculated without using a reference current value.

The present invention is the first to measure the resistance of a MR head assembly 410 by measuring a reference voltage across a reference resistance such as a reference resistor 305 and a test voltage across a first bias resistor 405, the MR head assembly 410, and a second bias resistor 415 connected in series while applying a constant reference current to each load 125. In addition, the present invention is the first to calculate the MR head assembly 410 resistance using a ratio of the reference current divided by the reference current such that the reference current is not a factor in the calculation.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to measure MR head resistance, the apparatus comprising:
a measurement module configured to measure a reference voltage across a reference resistance while applying a reference current to the reference resistance and measure a test voltage across a first biasing resistor, a MR head assembly, and a second biasing resistor connected in series while applying the reference current to the first biasing resistor, the MR head assembly, and the second biasing resistor; and
a computation module configured to calculate the MR head assembly resistance from the reference voltage, the test voltage, the reference resistance, and the resistances of the first and second biasing resistors;
wherein the computation module calculates the resistance of the MR head assembly as a function of a ratio of the reference current divided by the reference current such that a measurement of the reference current is not a factor in the calculation.

2. The apparatus of claim 1, wherein the reference current is within the range of twenty percent less and twenty percent more than the operating current of the MR head assembly.

3. The apparatus of claim 1, wherein the reference current is within the range of twenty percent less and twenty percent more than half the operating current of the MR head assembly.

4. The apparatus of claim 1, further comprising an automation module configured to automate the connection of the MR head assembly to the first and second biasing resistor.

5. The apparatus of claim 1, wherein the first and second biasing resistors are configured to bias the MR head assembly to a direct current voltage level.

6. A system to measure MR head resistance, the system comprising:
a test device configured to test a MR head assembly and comprising a measurement module that measures a reference voltage across a reference resistance while applying a reference current to the reference resistance and measures a test voltage across a first biasing resistor, the MR head assembly, and a second biasing resistor connected in series while applying the reference current to the first biasing resistor, the MR head assembly, and the second biasing resistor;
a communication channel; and
a host system in communication with the test device through the communication channel, configured to manage testing the MR head assembly, and comprising a computation module that calculates the MR head assembly resistance from the reference voltage, the test voltage, the reference resistance, and the resistances of the first and second biasing resistors;
wherein the computation module calculates the resistance of the MR head assembly as a function of a ratio of the reference current divided by the reference current such that a measurement of the reference current is not a factor in the calculation.

7. The system of claim 6, wherein the first and second biasing resistors are configured to bias the MR head assembly to a direct current voltage level.

8. The system of claim 6, the test device further comprising an automation module configured to automate the connection of the MR head assembly to the first and second biasing resistor.

9. A signal bearing medium tangibly embodying a program of machine-readable instructions executable by a digital processing apparatus to perform operations to measure MR head resistance, the operations comprising:
measuring a reference voltage across a reference resistance while applying a reference current to the reference resistance;
measuring a test voltage across a first biasing resistor, a MR head assembly, and a second biasing resistor connected in series while applying the reference current to the first biasing resistor, the MR head assembly, and the second biasing resistor; and calculating the MR head assembly resistance from the reference voltage, the test voltage, the reference resistance, and the resistances of the first and second biasing resistors, wherein calculating the MR head assembly resistance comprises using a ratio of the reference current divided by the reference current such that a measurement of the reference current is not a factor in the calculation.

10. The signal bearing medium of claim 9, wherein the reference current is within the range of twenty percent less and twenty percent more than the operating current of the MR head assembly.

11. The signal bearing medium of claim 9, wherein the reference current is within the range of twenty percent less and twenty percent more than half the operating current of the MR head assembly.

12. The signal bearing medium of claim 9, wherein the first and second biasing resistors are configured to bias the MR head assembly to a direct current voltage level.

13. The signal bearing medium of claim 9, wherein the instructions further comprise operations to automate the connection of the MR head assembly to the first and second biasing resistor.

14. A method for deploying manufacturing infrastructure, comprising integrating computer-readable code into a manufacturing system, wherein the code in combination with the manufacturing system is capable of performing the following:

measuring a reference voltage across a reference resistance while applying a reference current to the reference resistance;

measuring a test voltage across a first biasing resistor, a MR head assembly, and a second biasing resistor connected in series while applying the reference current to the first biasing resistor, the MR head assembly, and the second biasing resistor;

calculating the MR head assembly resistance from the reference voltage, the test voltage, the reference resistance, and the resistances of the first and second biasing resistors; and calculating the resistance of the MR head assembly using a ratio of the reference current divided by the reference current such that a measurement of the reference current is not a factor in the calculation.

15. The method of claim 14, wherein the reference current is within the range of twenty percent less and twenty percent more than the operating current of the MR head assembly.

16. The method of claim 14, wherein the reference current is within the range of twenty percent less and twenty percent more than half the operating current of the MR head assembly.

* * * * *